US010625555B2

(12) United States Patent
Evans

(10) Patent No.: US 10,625,555 B2
(45) Date of Patent: Apr. 21, 2020

(54) SHOCK ABSORBERS

(71) Applicant: ICON VEHICLE DYNAMICS LLC, Riverside, CA (US)

(72) Inventor: Dylan Samuel Evans, Corona, CA (US)

(73) Assignee: ICON VEHICLE DYNAMICS LLC, Riverside, CA (US)

( * ) Notice: Subject to any disclaimer, the term of this patent is extended or adjusted under 35 U.S.C. 154(b) by 0 days.

(21) Appl. No.: 16/048,122

(22) Filed: Jul. 27, 2018

(65) Prior Publication Data

US 2018/0334005 A1 Nov. 22, 2018

Related U.S. Application Data

(63) Continuation of application No. 15/473,399, filed on Mar. 29, 2017, now Pat. No. 10,035,396, which is a
(Continued)

(51) Int. Cl.
| *F16F 9/512* | (2006.01) |
| *B60G 13/08* | (2006.01) |
| *F16F 9/19* | (2006.01) |
| *F16F 9/348* | (2006.01) |
| *F16F 9/54* | (2006.01) |

(52) U.S. Cl.
CPC ............... *B60G 13/08* (2013.01); *F16F 9/19* (2013.01); *F16F 9/3482* (2013.01); *F16F 9/512* (2013.01); *B60G 2202/24* (2013.01); *B60G 2204/128* (2013.01); *B60G 2204/129* (2013.01); *B60G 2206/41* (2013.01); *B60G 2500/11* (2013.01); *F16F 9/54* (2013.01)

(58) Field of Classification Search
CPC .. F16F 9/065; F16F 9/516; F16F 9/446; F16F 9/50; F16F 9/512; F16F 9/3482; B60G 17/0416
USPC .............. 188/322.13, 322.14, 322.2, 281
See application file for complete search history.

(56) References Cited

U.S. PATENT DOCUMENTS 4,153,237 A * 5/1979 Supalla ................ B60G 17/04
188/266.8
4,407,396 A * 10/1983 Sirven .................... B60G 15/12
188/282.8
(Continued)

FOREIGN PATENT DOCUMENTS

DE 2744301 A1 4/1979
DE 10044182 A1 4/2001

OTHER PUBLICATIONS

International Search Report and Written Opinion of the International Searching Authority for International Application No. PCT/US2015/063228, dated Mar. 30, 2016, in 13 pages.
(Continued)

*Primary Examiner* — Thomas W Irvin
(74) *Attorney, Agent, or Firm* — Knobbe, Martens, Olson & Bear, LLP

(57) ABSTRACT

A shock absorber system can includes a shock tube and a piston slidably mated to an end of the shock tube. The system can include a heat sink reservoir. The heat sink reservoir can be connected to the shock tube via a valved fluid connection. The valved fluid connection can limit or permit fluid flow from the shock tube to the heat sink reservoir depending on fluid velocity and/or pressure.

18 Claims, 11 Drawing Sheets

Related U.S. Application Data continuation of application No. 14/956,150, filed on Dec. 1, 2015, now Pat. No. 9,610,819.

(60) Provisional application No. 62/087,139, filed on Dec. 3, 2014.

(56) References Cited

U.S. PATENT DOCUMENTS

| | | | |
|---|---|---|---|
| 4,756,517 A | 7/1988 | Kakimoto | |
| 4,936,424 A * | 6/1990 | Costa | F16F 9/064 |
| | | | 188/314 |
| 5,145,204 A | 9/1992 | Perkins | |
| 5,192,100 A | 3/1993 | Rumpel et al. | |
| 5,593,007 A | 1/1997 | Siltanen | |
| 5,620,172 A | 4/1997 | Fulks et al. | |
| 5,730,547 A | 3/1998 | Nogami | |
| 5,957,252 A * | 9/1999 | Berthold | B60G 11/30 |
| | | | 188/281 |
| 5,971,373 A | 10/1999 | Hsieh | |
| 6,029,958 A | 2/2000 | Larsson et al. | |
| 6,079,700 A | 6/2000 | Solomond et al. | |
| 6,213,261 B1 | 4/2001 | Kunkel | |
| 6,213,263 B1 * | 4/2001 | De Frenne | F16F 9/096 |
| | | | 188/318 |
| 6,269,920 B1 | 8/2001 | Handke | |
| 6,676,145 B2 | 1/2004 | Carlstedt et al. | |
| 6,997,293 B2 | 2/2006 | Tomonaga et al. | |
| 7,124,865 B2 * | 10/2006 | Turner | B60G 17/002 |
| | | | 188/322.2 |
| 7,497,308 B2 * | 3/2009 | McAndrews | B62K 25/04 |
| | | | 188/266.6 |
| 7,694,987 B2 | 4/2010 | McAndrews | |
| 7,793,954 B2 | 9/2010 | Kucinski et al. | |
| 7,926,633 B2 | 4/2011 | Lahargou et al. | |
| 8,196,942 B2 | 6/2012 | Heeren et al. | |
| 8,322,500 B2 | 12/2012 | Obrecht | |
| 8,413,934 B2 | 4/2013 | Hara | |
| 8,434,771 B2 * | 5/2013 | Yu | B60G 17/0162 |
| | | | 188/266.2 |
| 8,746,661 B2 | 6/2014 | Runkel | |
| 8,807,542 B2 | 8/2014 | Galasso et al. | |
| 8,910,759 B2 | 12/2014 | Marquar et al. | |
| 9,010,504 B2 | 4/2015 | Janes | |
| 9,228,630 B2 * | 1/2016 | Coaplen | F16F 9/3257 |
| 9,239,090 B2 | 1/2016 | Marking | |
| 9,610,819 B2 | 4/2017 | Evans | |
| 9,863,494 B2 * | 1/2018 | Yu | F16F 9/062 |
| 10,035,396 B2 | 7/2018 | Evans | |
| 2003/0218286 A1 | 11/2003 | Miyazaki et al. | |
| 2010/0206676 A1 | 8/2010 | Obrecht | |
| 2011/0085848 A1 | 4/2011 | Kim | |
| 2014/0054122 A1 * | 2/2014 | Coaplen | F16F 9/3257 |
| | | | 188/322.13 |
| 2016/0265614 A1 * | 9/2016 | Ripa | F16F 9/512 |

OTHER PUBLICATIONS

International Preliminary Report on Patentability and Written Opinion of the International Searching Authority for International Application No. PCT/US2015/063228, dated Jun. 15, 2017, in 7 pages.

\* cited by examiner

SHOCK ABSORBERS

CROSS-REFERENCE TO RELATED APPLICATIONS

Any and all applications for which a foreign or domestic priority claim is identified in the Application Data Sheet as filed with the present application are incorporated by reference under 37 CFR 1.57 and made a part of this specification.

TECHNICAL FIELD

Certain embodiments discussed herein relate to shock absorbers (e.g., suspension dampeners), and, more particularly, the present disclosure relates to shock absorbers for motor vehicles.

DISCUSSION OF THE RELATED ART

Shock absorbers are widely used in connection with motor vehicles to reduce shock to vehicles caused by roadway features such as bumps, dips, slopes, potholes, or other irregularities on the roadway. Shock absorbers may be positioned adjacent tires or other ground contact points on the motor vehicle.

SUMMARY

A shock absorber system can include a shock tube. The shock tube can have a first end, a second end, a central axis extending through the first end and the second end of the shock tube, and a tube volume. In some embodiments, the shock absorber system includes a piston rod having a first end and a second end and slidably connected to the second end of the shock tube, the first end and second end of the piston rod lying on the central axis of the shock tube. In some embodiments, the shock absorber system includes a piston head connected to the first end of the piston rod and positioned within the tube volume. The shock absorber system can include a piston mount connected to the second end of the piston and lying on the central axis of the shock tube. The piston mount can be configured to connect to a first position on a motor vehicle. In some embodiments, the shock absorber system includes a tube mount connected to an outer sidewall of the shock tube. The tube mount can be positioned offset from the central axis of the shock tube. In some embodiments, the tube mount is configured to connect to a second position on the motor vehicle. The shock absorber system can include a stabilization device connected to the tube mount. The stabilization device can be configured to reduce movement between the tube mount and the second position of the motor vehicle when the tube mount is connected to the second position of the motor vehicle.

According to some variants, a shock absorber system can include a shock tube. The shock tube can have a first end, a second end, a central axis extending through the first end and the second end of the shock tube, and a tube volume. In some embodiments, the shock absorber system includes a piston rod having a first end and a second end and slidably connected to the second end of the shock tube. In some embodiments, the shock absorber system includes a piston head connected to the first end of the piston rod and positioned within the tube volume. The shock absorber system can include a reservoir having a reservoir interior. In some embodiments, the shock absorber system includes a reservoir valve. The reservoir valve can have a first valve passage and a second valve passage. In some embodiments, the reservoir valve includes a valve mechanism configured to transition between an opened position and a closed position. The valve mechanism can be configured to remain normally in the closed position and to inhibit flow through the first valve passage when in the closed position. In some embodiments, the shock absorber system includes a first fluid line in fluid communication with the tube volume and the first valve passage. In some embodiments, the shock absorber system includes a second fluid line in fluid communication with the tube volume and the second valve passage. The valve mechanism can be configured to remain in the closed position when a velocity of fluid within the first fluid line is below a threshold velocity. In some embodiments, the valve mechanism transitions to the opened position when the velocity of the fluid within the first fluid line is at or above the threshold velocity.

According to some variants, a shock absorber system can include a shock tube having a first end, a second end, a central axis extending through the first and second ends, and/or an outer wall extending between the first and second ends of the shock tube. In some embodiments, the shock absorber system includes a piston rod. The piston rod can extend at least partially into the shock tube through the second end of the shock tube. In some embodiments, the piston rod has a first end positioned within the shock tube and a second end positioned outside of the shock tube. The piston can have a longitudinal axis parallel to the central axis of the shock tube and extending through the first and second ends of the piston rod. In some embodiments, the second end of the piston rod is configured to connect to a first mounting point on a vehicle. In some embodiments, the shock absorber system includes a tube mount. The tube mount can be offset from the central axis of the shock tube. In some embodiments, the tube mount is connected to the outer wall of the shock tube between the first and second ends of the shock tube. The tube mount can be configured to connect to a second mounting point on a vehicle. In some embodiments, the shock absorber system includes a stabilizing device connected to the tube mount. The stabilizing device can include a first arm connected to the tube mount and extending away from the tube mount in a first direction. In some embodiments, the stabilizing device includes a second arm connected to the first arm at a first connection point and to the outer wall of the shock tube at a second connection point. The second arm can have a fixed length. In some embodiments, the second arm is configured to maintain a fixed distance between the first connection point and the second connection point to inhibit or prevent movement of the shock tube in a direction perpendicular to a line perpendicular to the central axis of the shock tube and passing through the central axis of the shock tube and though the tube mount.

According to some variants, a shock absorber system can include a shock tube having a first end, a second end, a central axis extending through the first end and the second end of the shock tube, and a tube volume. In some embodiments, the shock absorber system includes a piston rod having a first end and a second end. In some embodiments, the piston rod is slidably connected to the second end of the shock tube. In some embodiments, the first end and second end of the piston rod lie on the central axis of the shock tube. In some embodiments, the shock absorber system includes a piston head connected to the first end of the piston rod and positioned within the tube volume. In some embodiments, the shock absorber system includes a piston mount connected to the second end of the piston and lying on the central axis of the shock tube. The piston mount can be configured to connect to a first position on a motor vehicle. In some embodiments, the shock absorber system includes a tube mount connected to an outer sidewall of the shock tube. The tube mount can be positioned offset from the central axis of the shock tube. In some embodiments, the tube mount is configured to connect to a second position on the motor vehicle. In some embodiments, the shock absorber system includes a stabilization device connected to the tube mount and configured to reduce movement between the tube mount and the second position of the motor vehicle when the tube mount is connected to the second position of the motor vehicle.

In some embodiments, the tube mount is positioned between the first and second ends of the shock tube.

In some embodiments, the shock absorber system includes a rod guide positioned at least partially within the tube volume. The rod guide can be configured to slidably engage the piston rod and to inhibit misalignment of the piston rod with respect to the central axis of the shock tube.

In some embodiments, the stabilization device comprises a first arm connected to the tube mount and a second arm connected to the first arm and to the shock tube.

In some embodiments, the first arm extends along an axis perpendicular to the central axis of the shock tube and perpendicular to a line passing through the central axis of the shock tube and a center of the tube mount.

In some embodiments, the second arm extends along an axis parallel to the line passing through the central axis of the shock tube and the center of the tube mount.

In some embodiments, a length of the first arm is adjustable.

In some embodiments, a length of the second arm is adjustable.

In some embodiments, the shock absorber system includes an end cap on the first end of the shock tube. In some embodiments, the tube mount is not connected to the end cap.

In some embodiments, the piston head is configured to reciprocate over a stroke length. In some embodiments, the stroke length extends over at least 70% of a length of the shock tube. In some embodiments, the stroke length extends over at least 80% of the length of the shock tube.

According to some variants, a shock absorber system can includes a shock tube having a first end, a second end, a central axis extending through the first end and the second end of the shock tube, and a tube volume. The shock absorber system can include a piston rod having a first end and a second end. The piston rod can be slidably connected to the second end of the shock tube. In some embodiments, the shock absorber system includes a piston head connected to the first end of the piston rod and positioned within the tube volume. The shock absorber system can include a reservoir having a reservoir interior. In some embodiments, the shock absorber system includes a reservoir valve. The reservoir valve can include a first valve passage and/or a second valve passage. In some embodiments, the reservoir valve includes a valve mechanism configured to transition between an opened position and a closed position. The valve mechanism can be configured to remain normally in the closed position. In some embodiments, the valve mechanism inhibits flow between the first valve passage and the reservoir interior when in the closed position. The shock absorber system can include a first fluid line in fluid communication with the tube volume and the first valve passage. In some embodiments, the shock absorber system includes a second fluid line in fluid communication with the tube volume and the second valve passage. In some embodiments, the valve mechanism remains in the closed position when a velocity of fluid within the first fluid line is below a threshold velocity. In some embodiments, the valve mechanism transitions to the opened position when the velocity of the fluid within the first fluid line is at or above the threshold velocity.

In some embodiments, the reservoir valve comprises a valve body through which the first and second valve passages extend.

In some embodiments, the shock absorber system includes one or more seals configured to seal the valve body against an interior surface of the reservoir.

In some embodiments, the valve body is at least partially constructed from a flexible or semi-flexible material configured to seal against an interior surface of the reservoir.

In some embodiments, the valve mechanism comprises a flap portion configured to cover the first valve passage when the valve mechanism is in the closed position and to deflect away from the first valve passage when the valve mechanism is in the opened position.

In some embodiments, the flap portion is more flexible than a remaining portion of the valve mechanism.

In some embodiments, the valve mechanism is connected to the valve body.

In some embodiments, the valve mechanism is connected to the valve body via one or more fasteners.

BRIEF DESCRIPTION OF THE DRAWINGS

The present disclosure is described with reference to the accompanying drawings, in which like reference characters reference like elements, and wherein.

DETAILED DESCRIPTION

Figure 1:
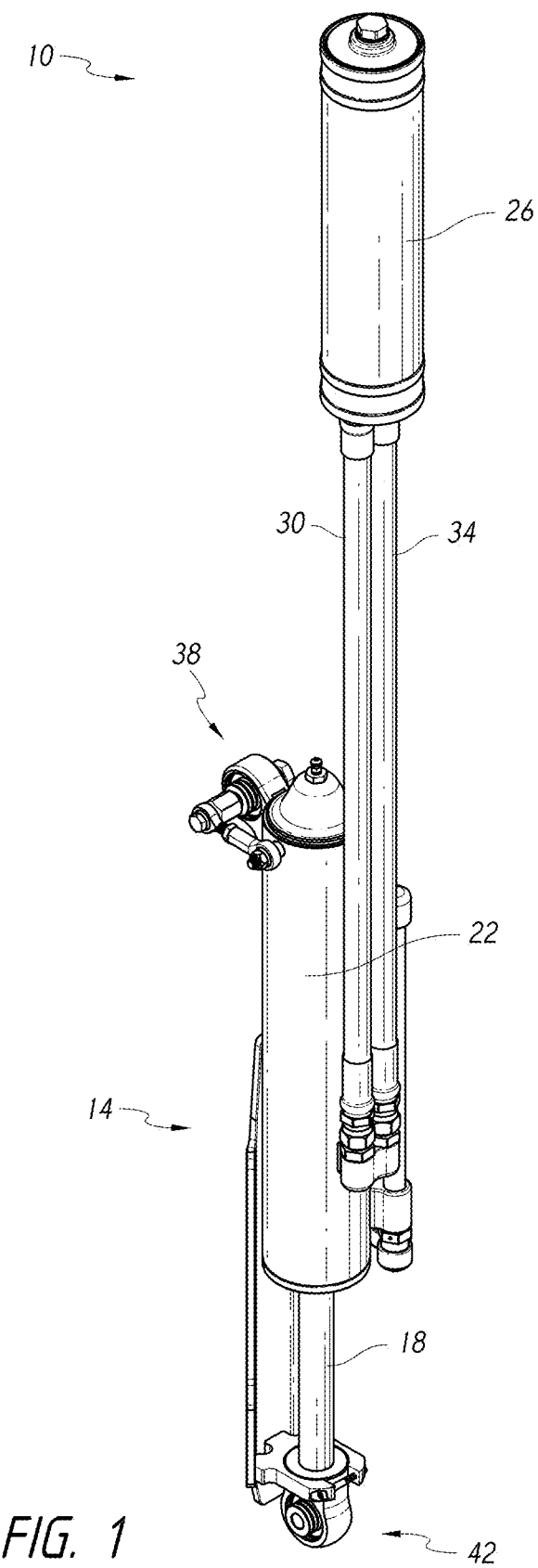
FIG. 1 is a perspective view of an embodiment of a shock absorber system.
Figure 2:
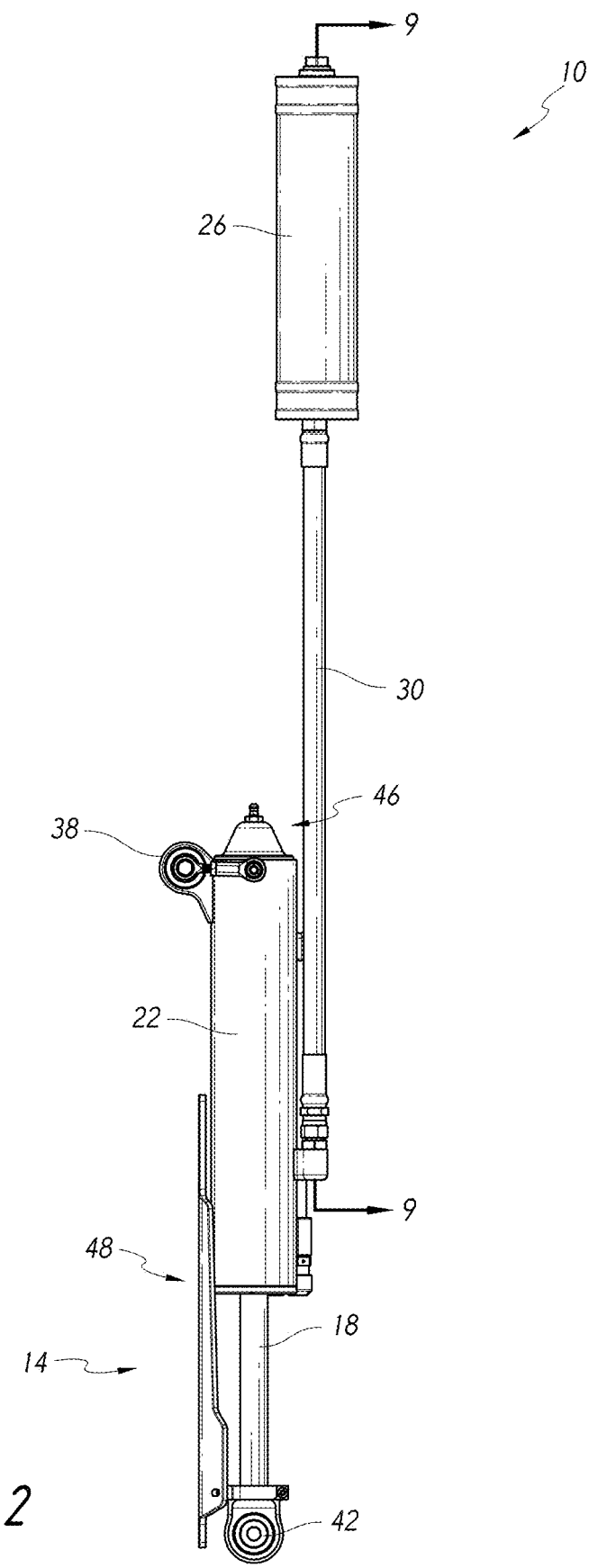
FIG. 2 is a left side plan view of the shock absorber system of FIG. 1.
Figure 3:
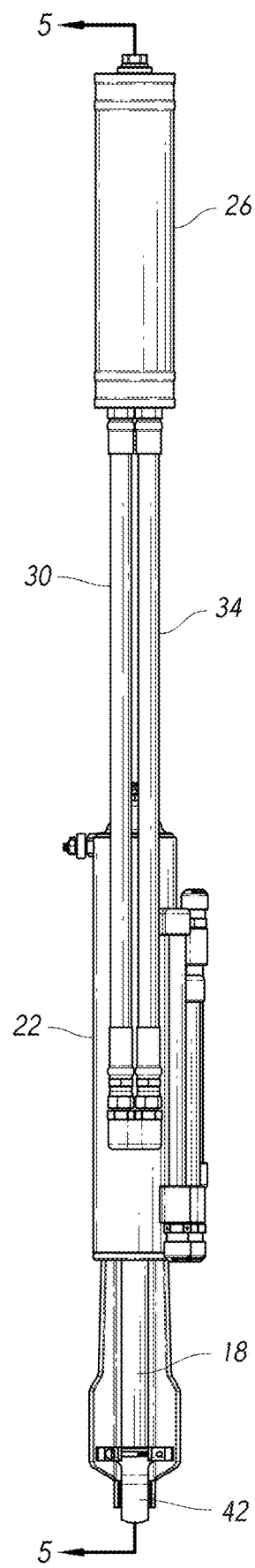
FIG. 3 is a front plan view of the shock absorber system of FIG. 1.
Figure 4:
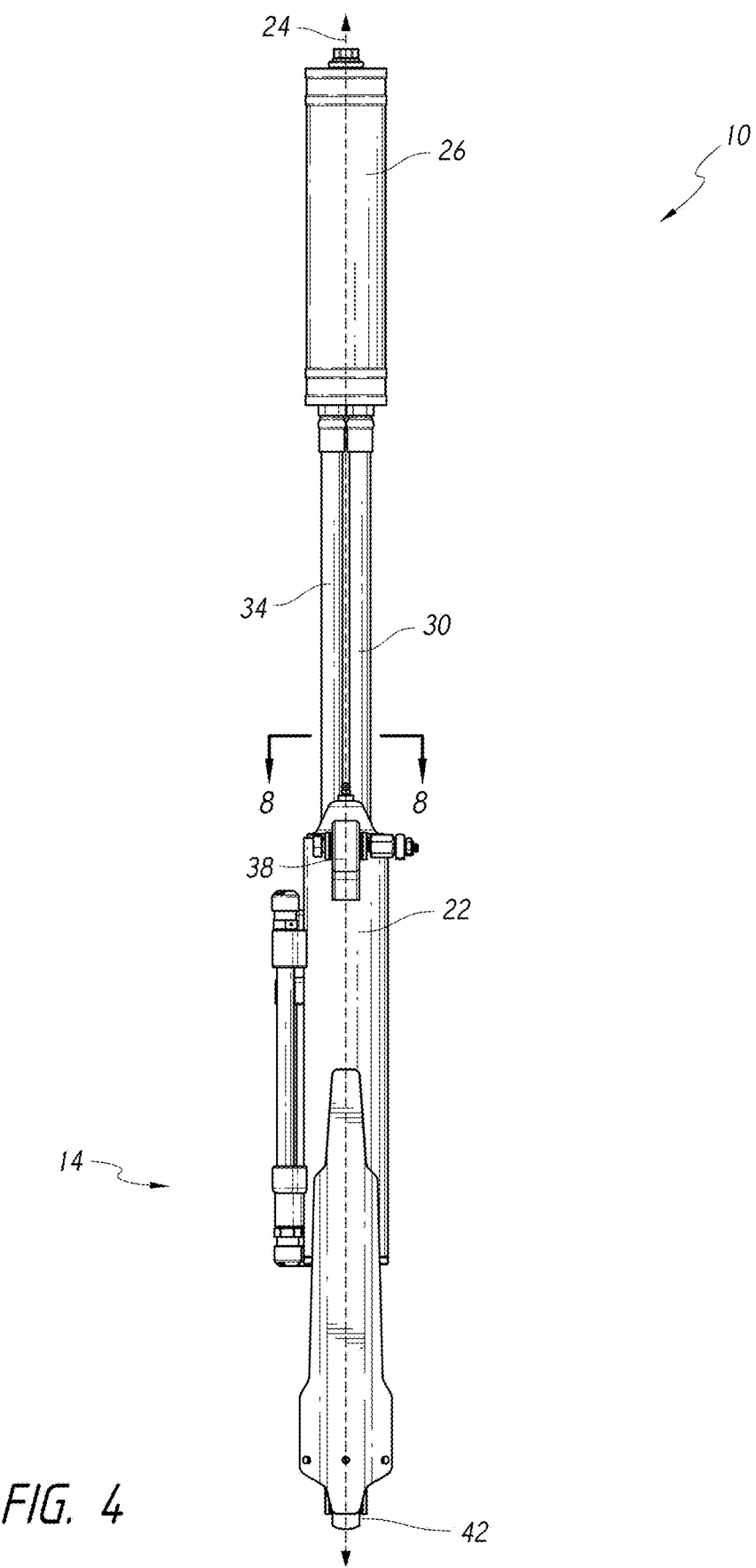
FIG. 4 is a rear plan view of the shock absorber system of FIG. 1.

As illustrated in FIGS. 1-4, a shock absorber system 10 can include a shock assembly 14. The shock assembly 14 can include a piston rod 18 coupled to a tube 22 (e.g., to a second end 48 of the tube 22). The system 10 can include a heat sink reservoir 26. The reservoir 26 can be fluidly connected to the tube 22 via one or more fluid line or other connections. For example, the reservoir 26 can be connected to the tube 22 via a first fluid line 30 and a second fluid line 34. Each of the first and second fluid lines 30, 34 can provide fluid communication between an interior of the tube 22 and an interior of the reservoir 26.

The shock absorber system 10 can be configured to attach to mounts or other frame portions of a vehicle (e.g., a truck, car, van, ATV, motorcycle, dirt bike, bicycle, or any other motorized or non-motorized vehicle). For example, the system 10 can include a tube mount 38 attached to the tube 22 near a first end 46 of the tube 22. The tube mount 38 can be configured to attach the tube 22 to a vehicle via fasteners or other attachment structures or methods. The system 10 can include a piston mount 42 attached to a second end the piston rod 18 and configured to attach the piston rod 18 to a portion of a vehicle (e.g., a portion of the vehicle spaced from the mounting point of the tube mount 38). The tube 22 and piston rod 18 can be mounted in positions on the vehicle such that the piston rod reciprocates within and out of the tube 22 in response to reciprocation of the wheels of the vehicle in response to running conditions (e.g., obstacles, turns, accelerations, decelerations, etc.). In some embodiments, the piston rod 18 extends along an axis parallel or substantially parallel to a centerline 24 of the tube 22.

Figure 5:
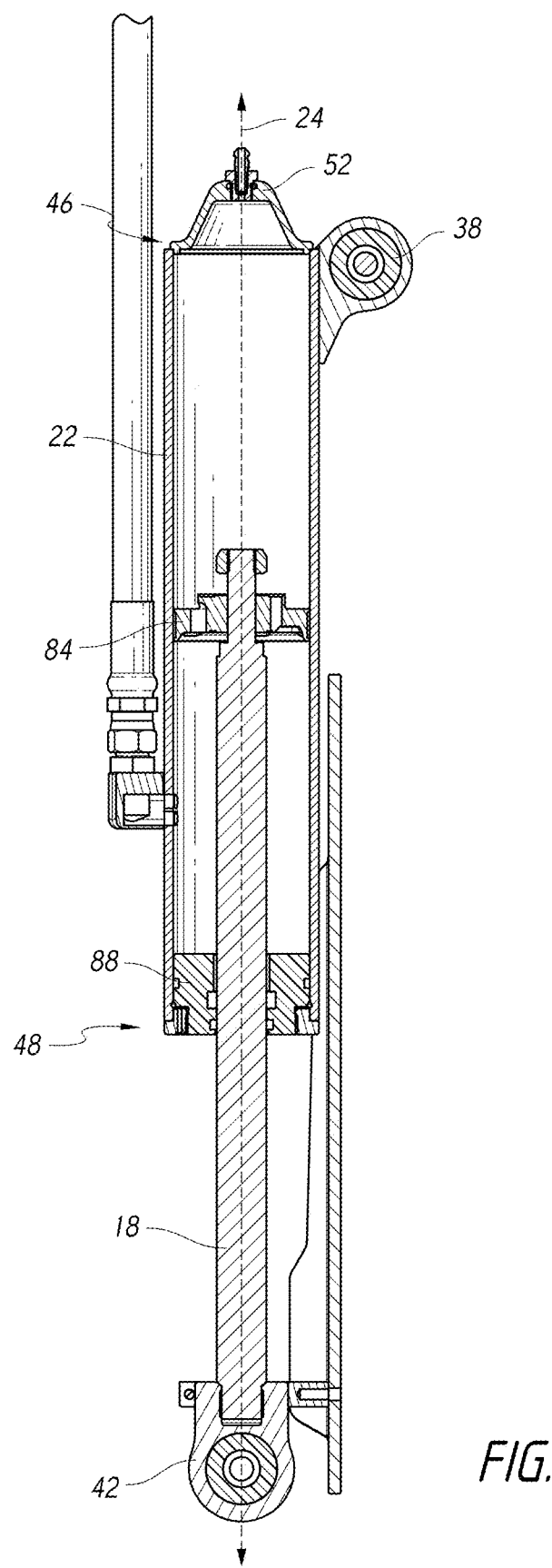
FIG. 5 is a cross-section view of the shock absorber system of FIG. 1 along the cut plane 5-5 of FIG. 3.

As illustrated in FIG. 5, the system 10 can include an end cap 52 positioned on the first end 46 of the tube 22. The end cap 52 can be configured to seal the first end 46 of the tube 22. Sealing of the first end of the tube 22 can inhibit or prevent leakage of fluid from the interior of the tube 22 to the surrounding environment.

The piston rod 18 can be connected to a piston head 84. The piston head 84 can be moveable within the tube 22. For example, the piston rod 18 can drive movement of the piston head 84 within the tube 22 in response to running conditions of the vehicle. In some embodiments, a rod guide 88 can be slidably coupled to a first end of the piston rod 18 within the tube 22. The rod guide 88 can be configured to sealingly engage with the piston rod 18 to inhibit or prevent leakage of fluid between the piston rod 18 and the rod guide 88 (e.g., leakage through the second end 48 of the tube 22.

In some embodiments, the tube mount 38 can be positioned offset from a centerline 24 of the tube 22. For example, the tube mount 38 can be connected to a sidewall of the tube 22. In some embodiments, the tube mount 38 is connected to a sidewall of the tube 22 between the first and second ends 46, 48 of the tube.

Figure 6:
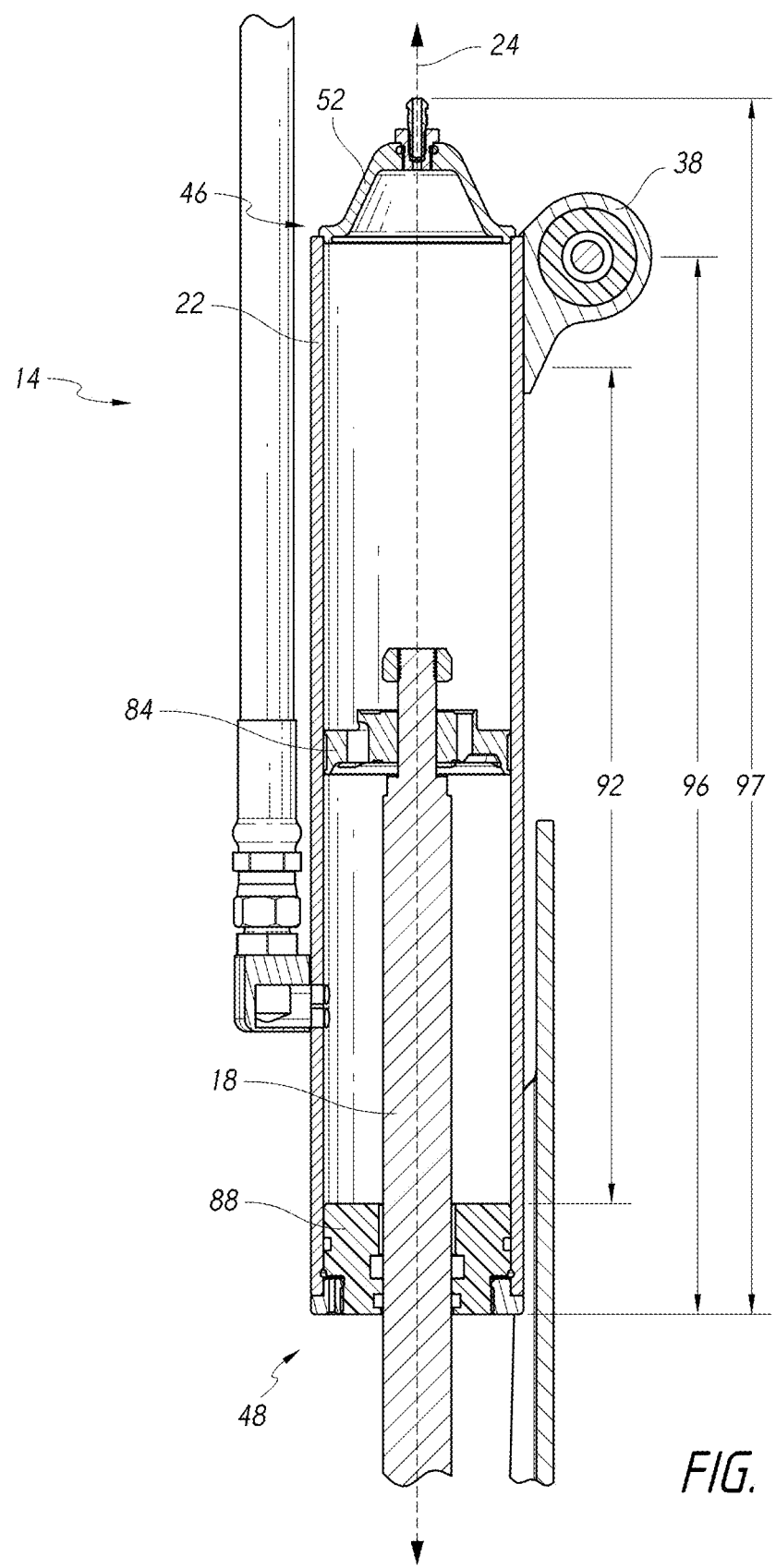
FIG. 6 is a close-up cross-section view of the shock absorber system of FIG. 1 along the cut plane 5-5 of FIG. 3.

In some embodiments, as illustrated in FIG. 6, the tube mount 38 is positioned at a vertical distance 96 (e.g., a distance parallel to the centerline 24) from the second end 48 of the tube 22. The vertical distance 96 of the tube mount 38 from the second end 48 can be less than the length 97 of the tube 22. For example, the vertical distance 96 can be between about ½ and ¾, between about ⅝ and 9/10, between about ⅔ and ⅞, and/or between about ⅗ and 19/20 of the length 97 of the tube 22. In some embodiments, the vertical distance 96 is approximately ⅚ of the length 97 of the tube 22.

As illustrated in FIG. 6, the piston rod 18 can have a maximum stroke length 92 between the first and second ends 46, 48 of the tube 22. Offsetting the tube mount 38 from the centerline 24 of the tube 22 can increase the usable stroke length 92 of the shock assembly 14 for a given vehicle when compared to a shock assembly wherein the tube mount is positioned on the end (e.g., above the cap 52 in FIG. 6) of the tube. In some such cases, increased usable stroke length 92 is achieved due to increased usage of the space between the two shock mounting points on the vehicle in which the shock assembly 14 is installed. Increased stroke length can improve performance of the shock absorber system 10 via, for example, increased range of dampened motion of the vehicle wheels with respect to the frame of the vehicle. In some embodiments, increased stroke length of the shock absorber system 10 can permit usage of lower-viscosity fluid in the tube 22 than may otherwise be usable.

In some embodiments, the usable stroke length 92 comprises at least 75% of the vertical distance 96 between the tube mount 38 and the second end 48 of the tube 22. In some embodiments, the usable stroke length 92 comprises at least 60%, at least 70%, at least 80%, and/or at least 90% of the vertical distance 96 between the tube mount 38 and the second end 48 of the tube 22.

In some embodiments, offsetting the tube mount 38 from the centerline 24 of the tube 22 can introduce mechanical stresses between the tube mount 38 and the point on the vehicle to which the tube mount 38 is mounted. For example, a rotational moment 66 (FIG. 8) can be introduced about an axis substantially parallel to the centerline 24 (e.g., within 10° of parallel) at the interface between the tube mount 38 and the mounting point 70 of the vehicle. In some embodiments, offsetting the tube mount 38 from the centerline 24 can increase the likelihood of movement of the tube 22 in directions non-parallel to the centerline 24 of the tube 22. For example, the tube mount 38 can, in some embodiments, be a spherical joint configured to permit movement (e.g., rotation) between the mount 38 and the vehicle, in the absence of further structure configured to limit. Such movement of the mount 38 can be undesirable as it may lead to movement of the tube 22 into contact with other structures of the vehicle.

Figure 7:
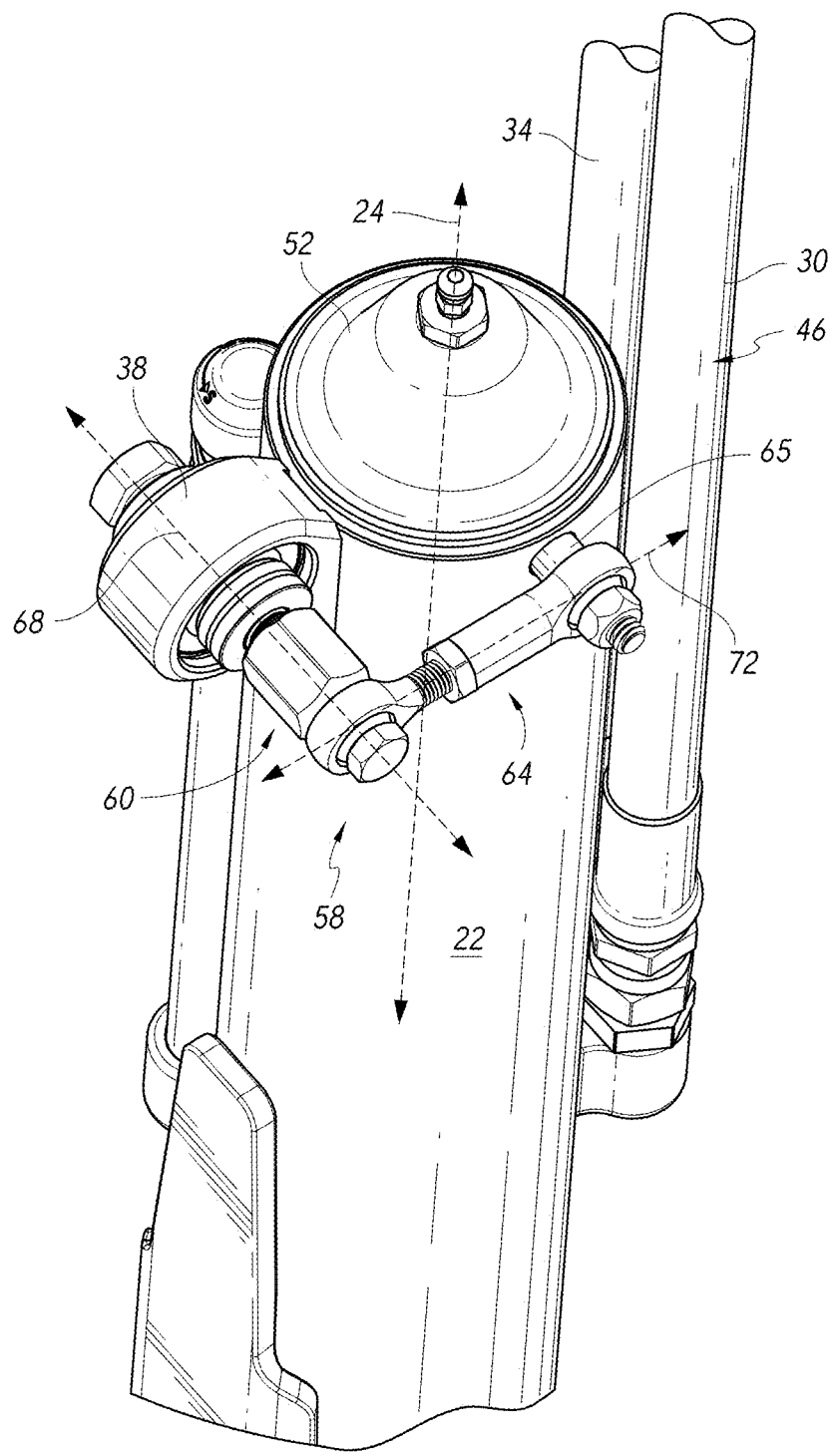
FIG. 7 is a close-up perspective view of a stabilization device of the shock absorber system of FIG. 1.
Figure 8:
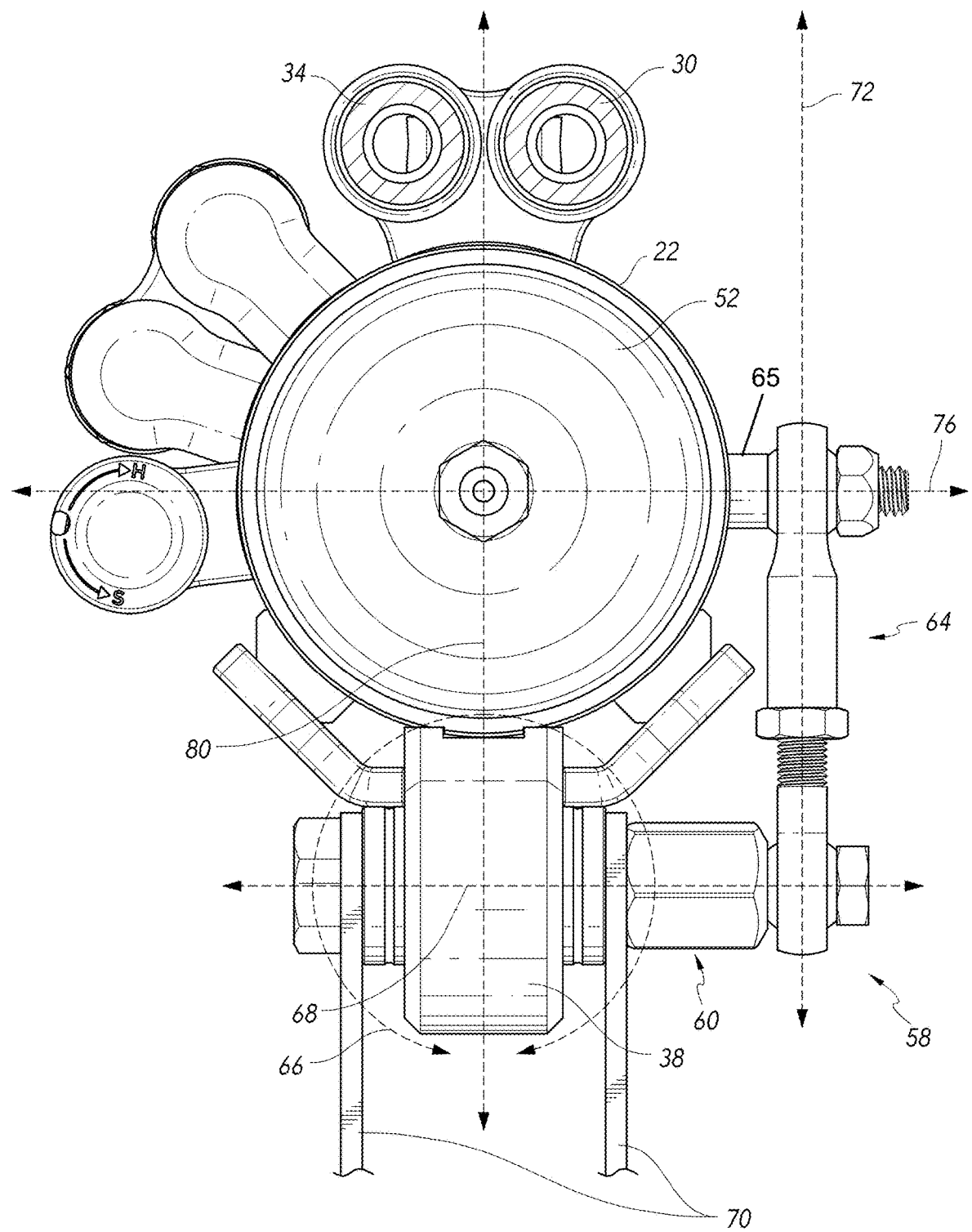
FIG. 8 is a top plan view of the stabilization device of the shock absorber system of FIG. 1 along the cut plane 8-8 of FIG. 4, wherein the tube mount is connected to a vehicle connection point.

As illustrated in FIGS. 7 and 8, a stabilizing device 58 can be used to stabilize the connection between the tube mount 38 and the vehicle (e.g., the mounting arms 70) to which the shock assembly 14 is mounted. The stabilizing device 58 can be configured to reduce stresses between the frame of the vehicle and the mount 38 or other components of the shock absorber system 10. In some embodiments, the stabilizing device 58 is configured to restrict movement of the tube mount 38 with respect to the frame of the vehicle, other than those movements intended during use.

In some embodiments, the stabilizing device 58 includes one or more arms. For example, the stabilizing device 58 can include a first arm 60. The first arm 60 can be connected to the tube mount 38 (e.g., vial threaded engagement, welding, adhesives, and/or some other connection method or structure). The first arm 60 can extend from the tube mount 38. In some embodiments, the first arm 60 extends in a direction perpendicular to the centerline 24 of the tube 22.

In some embodiments, a first end of the first arm 60 is connected to the mounting point on the vehicle and a second end of the first arm 60 is positioned away from the tube mount 38 on a first arm axis 68 substantially perpendicular to a first alignment axis 80 extending through the centerline 24 of the tube 22 and through the tube mount 38. In some embodiments, the first arm axis 68 is substantially perpendicular to the centerline 24 of the tube 22.

The stabilizing device 58 can include a second arm 64. The second arm 64 can be connected to a sidewall of the tube 22 and to the first arm 60. For example, the second arm can connect directly to the sidewall of the tube 22 or to an attachment structure 65 connected to the sidewall of the tube 22. In some embodiments, a first end of the second arm 64 is connected to the first arm 60 and a second end of the second arm 64 is connected to the sidewall of the tube 22.

As illustrated in FIG. 8, the second arm 64 can lie along a second arm axis 72. The second arm axis 72 can be substantially perpendicular to the first arm axis 68. In some embodiments, the second end of the second arm 64 is connected to a point on the sidewall of the tube 22 that lies on a second alignment axis 76 parallel to the first arm axis 68 and passing through or near the centerline 24. In some embodiments, alignment of the second arm 64 in such a manner can influence the load or displacement path of the device 10 along the centerline 24. The stabilizing device 58 can include one or more structures configured to tighten and/or loosen connection between the arms 60, 64, the mount 38, and the tube 22. For example, one or more nuts can be positioned on the arms, on the mount 38, and/or on the tube 22 to tighten or loosen the connection points between these components. In some embodiments, the lengths of the arms 60, 64 can be adjusted, for example, rotation of one portion of an arm (e.g., via threaded engagement) with respect to another portion of that arm.

As illustrated, for example, in FIG. 8, the first arm 60, second arm 64, first alignment axis 80, and second alignment axis 78 can form a rectangle, parallelogram, or trapezoid. In some embodiments, the stabilizing device 58 can reduce movement and undetermined degrees of freedom (e.g., wobble) between the tube mount 38 and the vehicle to which the shock assembly 14 is mounted. For example, if forces on the tube 22 are directed to the left in FIG. 8, a counter-clockwise moment force 66 is generated at the interface between the tube mount 38 and the portion of the vehicle to which the tube mount 38 is connected (e.g., the mounting arms 70). Leftward forces on the tube 22 can incline the tube 22 to move to the left, which can incline the attachment structure 65 to move away from the first arm 60. The second arm 64, which can be rigid and/or have a fixed length, can inhibit or prevent movement of the attachment structure 65 away from the first arm 60. Inhibiting or preventing movement of the attachment structure 65 away from the first arm 60 can inhibit or prevent movement of the tube 22 leftward in the frame of reference of FIG. 8. In some embodiments, the second arm 64 is configured to maintain a fixed distance between a first connection point (e.g., wherein the second arm 64 attaches to the first arm 60) and a second connection point (e.g., where the second arm 64 attaches to the tube 22 or attachment structure 65) to inhibit or prevent movement of the shock tube 22 in a direction perpendicular to a line perpendicular to the central axis of the shock tube 22 and passing through the central axis 24 of the tube 22 and through the tube mount 38.

In some such embodiments, the stresses generated by the force on the tube 22 are distributed among the first and second arms 60, 64 and the corresponding mounting points. For example, the leftward stresses on the tube 22 can be partially imparted on the second arm 64 and a moment force can be generated at the junction between the second arm 64 and the tube 22. Introduction of stress to the second arm 64 can create a moment force at the junction between the first and second arms 60, 64. This moment force at the junction between the first and second arms 60, 64 can introduce stresses to the first arm 60.

In some cases, when a rightward stress force the frame of reference of FIG. 8 is introduced to the tube 22, a clockwise moment force 66 can be introduced at the interface between mount 38 and the mounting arms 70. Rightward forces on the tube 22 can incline the tube 22 to move to the right, which can incline the attachment structure 65 to move toward the first arm 60. The second arm 64, which can be rigid and/or have a fixed length, can inhibit or prevent movement of the attachment structure 65 toward the first arm 60. Inhibiting or preventing movement of the attachment structure 65 toward the first arm 60 can inhibit or prevent movement of the tube 22 rightward in the frame of reference of FIG. 8.

In some embodiments, rightward force on the tube 22 can transfer force to the second arm 64 and can introduce a moment force at the junction between the second arm 64 and the tube 22. Force on the second arm 64 can introduce a moment force at the junction between the first and second arms 60, 64 and can introduce force to the first arm 60.

In some embodiments, distribution of forces as described above can reduce the stresses (e.g., the moment force 66) at the interface between the tube mount 38 and the portion of the vehicle to which the tube mount 38 is connected (e.g., the arms 70). Distribution of forces and stresses throughout the components of the stabilizing device 58 can reduce or eliminate movement of the tube 22 in the left and right directions of FIG. 8 (e.g., parallel to the second alignment axis 76). Reduced movement of the tube 22 along the second alignment axis 76 can reduce or eliminate the risk of the tube 22 inadvertently contacting other portions of the vehicle (e.g., leaf springs, wheel wells, wheels, etc.) during operation of the vehicle. In some embodiments, distribution of forces and stresses through the stabilizing device 58 reduces the stresses at the interface between the mount 38 and the mounting point (e.g., the mounting arms 70) of the vehicle. Reduction of stress at the interface between the mount 38 and the mounting arms 70 can reduce the likelihood of bending or other deformation of the arms 70 or other vehicle mounting structure.

Figure 9:
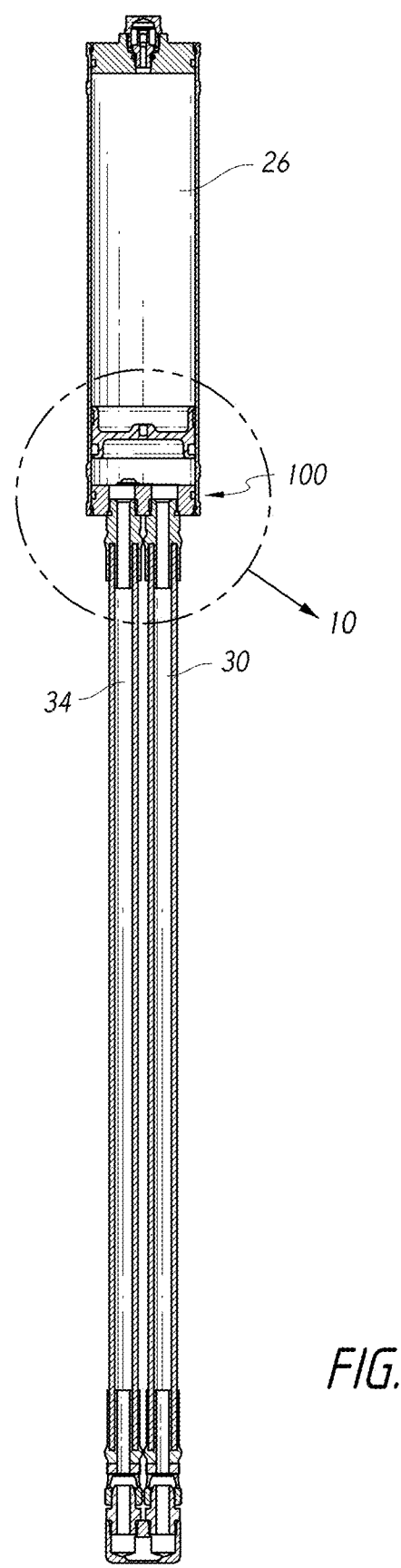
FIG. 9 is a cross-section view of a reservoir of the shock absorber system of FIG. 1 along the cut plane 9-9 of FIG. 2.

FIG. 9 illustrates an example of a reservoir 26 can be used in connection with the shock assembly 14. A reservoir valve 100 can be positioned between the first and second fluid lines 30, 34 and/or between one or more of the fluid lines 30, 34 and the interior of the reservoir 26. In some embodiments, the reservoir valve 100 is positioned entirely within the reservoir 26.

Figure 10:
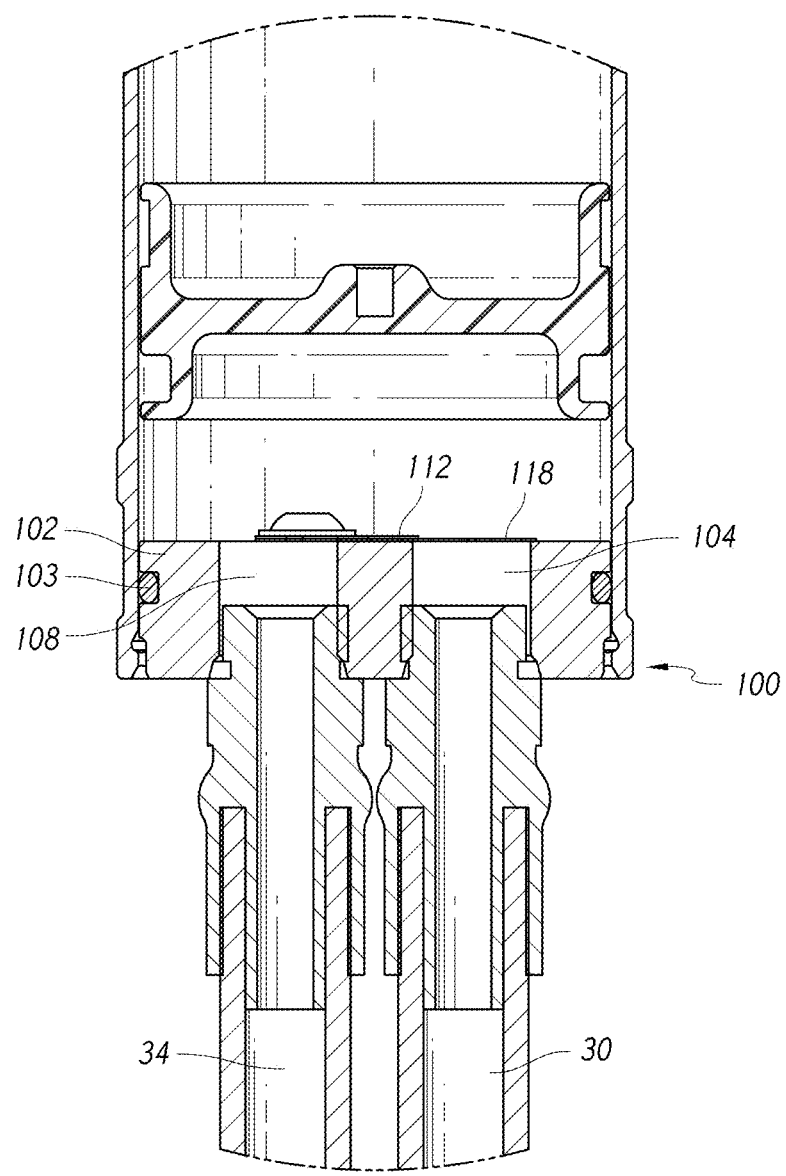
FIG. 10 is a cross-section view of a reservoir valve of the shock absorber system of FIG. 1 along the cut plane 9-9 of FIG. 2.

As illustrated in FIG. 10, the reservoir valve 100 can include a valve body 102. The valve body 102 can sealingly engage with the inner walls of the reservoir 26. For example, one or more seals 103 (e.g., O-rings, gaskets, etc.) can be positioned between the valve body 102 and the inner walls of the reservoir 26. In some embodiments, the valve body 102 is at least partially constructed from a flexible or semi-flexible material configured to sealingly engage with the inner walls of the reservoir 26.

The valve body 102 can include one or more valve passages. For example, the valve body 102 can include a first valve passage 104 and a second valve passage 108. In some embodiments, the first fluid line 30 is configured to fluidly connect to the first valve passage 104 and the second fluid line 34 is configured to fluidly connect to the second valve passage 108.

The reservoir valve 100 can include a valve mechanism 112. The valve mechanism 112 can be a one-way valve mechanism. For example, the valve mechanism 112 can be a one-way valve mechanism (e.g., flap valve, duck bill valve, ball valve, a leaf spring, or any other one-way valve mechanism) configured to inhibit or prevent fluid passage to one or both of the fluid lines 30, 34 from the reservoir 26.

Figure 11:
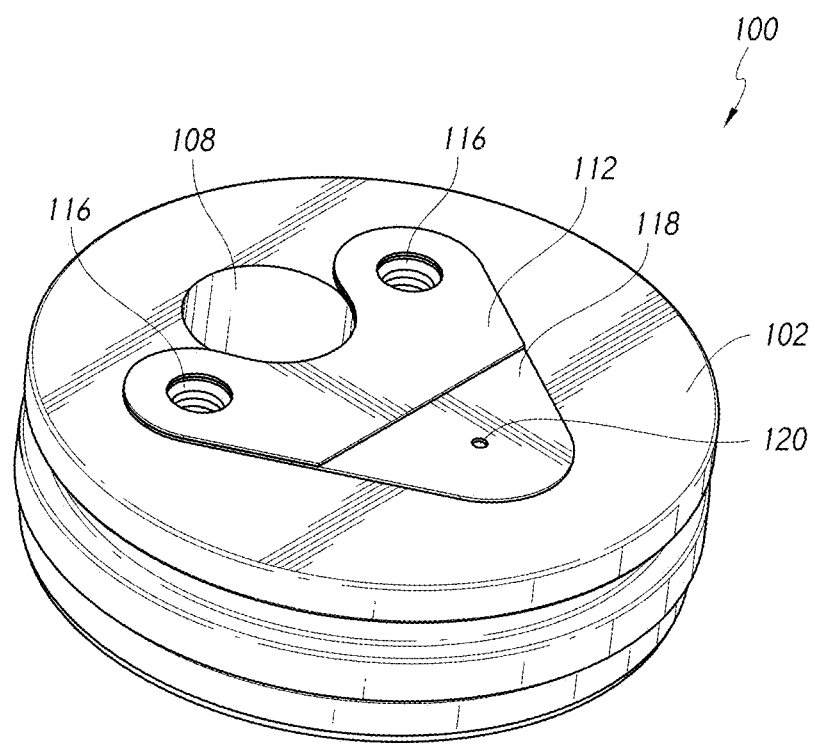
FIG. 11 is a perspective view of the reservoir valve of FIG. 10.
Figure 12:
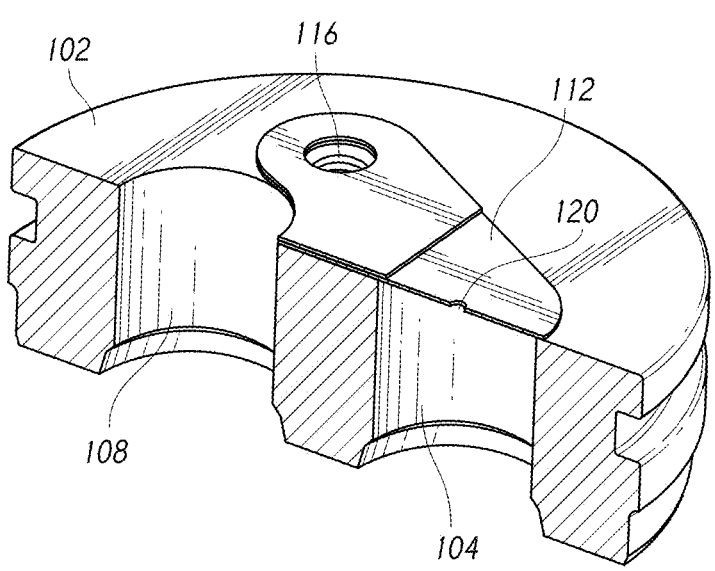
FIG. 12 is a perspective cross-section view of the reservoir valve of FIG. 10.

As illustrated in FIGS. 11 and 12, the valve mechanism 112 can be attached to the valve body 102. For example, the valve mechanism 112 can be connected to the valve body 102 via adhesives, welding, and/or via fasteners (e.g., fasteners inserted through the apertures 116).

In some embodiments, the valve mechanism 112 has a flat or substantially flat shape. The valve mechanism 112 can be constructed from one or more layers of flattened metal, polymer, or other material. One or more portions of the valve mechanism 112 can be flexible, semi-flexible, and/or resilient.

The valve mechanism 112 can include a flap portion 118 configured to selectively obstruct one or more of the valve passages 104, 108. In some embodiments, the flap portion 118 is more flexible than all or a portion of the remainder of the valve mechanism 112. The flap portion 118 can be thinner than a remainder of the valve mechanism 112. In some embodiments, the flap portion 118 is constructed from a material more flexible than the material used for all or a portion of the remainder of the valve mechanism 112. In some embodiments, the flap portion 118 is constructed from fewer layers (e.g., one layer) of material than all or a portion of the remainder of the valve mechanism 112. In some embodiments, the flap portion 118 can obstruct the first valve passage 104 to inhibit flow between the first fluid line 30 and the reservoir 26 when the flap portion 118 is in a lowered position (e.g., as illustrated in FIGS. 11 and 12). The flap portion 118 can be configured to transition to a raised position wherein at least a portion of the flap portion 118 is positioned away from the first valve passage 104 to permit fluid flow from the first fluid line 30 to the reservoir 26. For example, the flap portion 118 can be configured to transition to the raised position in response to high velocity flow from first fluid line 30 to the reservoir 26. In some embodiments, the flap portion 118 is configured to transition to the raised position in response to an increased pressure (e.g., a threshold pressure) in the first fluid line 30. The flap portion 118 can be configured to return to the lowered position when the high velocity and/or high pressure fluid condition ceases.

The valving function of the reservoir valve 100 can permit fluid to pass in both directions between the tube 22 and the reservoir 26 through one fluid line (e.g., the second fluid line 34) while limiting fluid flow through the other fluid line (e.g., the first fluid line 30) to a selective, one-way flow from the tube 22 to the reservoir which occurs only when the flow in the other fluid line reaches a sufficient velocity and/or pressure. In some such embodiments, the heat sink performance of the reservoir 26 can be improved during high-performance scenarios (e.g., high-fluid-velocity scenarios) through use of two fluid lines into the reservoir 26.

For expository purposes, the term "horizontal" as used herein is defined as a plane parallel to the plane or surface of the floor of the area in which the system being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

While the preferred embodiments of the present disclosure have been described above, it should be understood that they have been presented by way of example only, and not of limitation. It will be apparent to persons skilled in the relevant art that various changes in form and detail can be made therein without departing from the spirit and scope of the disclosure. Thus the present disclosure should not be limited by the above-described exemplary embodiments, but should be defined only in accordance with the following claims and their equivalents. Furthermore, while certain advantages of the disclosure have been described herein, it is to be understood that not necessarily all such advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other advantages as may be taught or suggested herein.

What is claimed is:

1. A shock absorber system comprising:
   a shock tube comprising a first end, a second end, a central axis extending through the first end and the second end of the shock tube, and a tube volume;
   a piston rod comprising a first end and a second end and slidably connected to the second end of the shock tube;
   a piston head connected to the first end of the piston rod and positioned within the tube volume;
   a reservoir comprising a reservoir interior;
   a reservoir valve comprising a first valve passage, a second valve passage, and a valve mechanism configured to transition between an opened position and a closed position, the valve mechanism configured to remain in the closed position and to inhibit flow between the first valve passage and the reservoir interior when in the closed position while permitting flow between the second valve passage and the reservoir interior when in the closed position;
   a first fluid line in fluid communication with the tube volume and the first valve passage; and
   a second fluid line in fluid communication with the tube volume and the second valve passage, the second fluid line separate from the first fluid line between the shock tube and the reservoir,
   wherein the valve mechanism is configured to remain in the closed position when a velocity of fluid within the first fluid line is below a threshold velocity, and wherein the valve mechanism is configured to transition to the opened position when the velocity of fluid within the first fluid line is at or above the threshold velocity,
   wherein reservoir valve comprises a valve body through which the first and second valve passages extend, and wherein the valve body is at least partially constructed from a flexible or semi-flexible material configured to seal against an interior surface of the reservoir.

2. The system of claim 1, comprising one or more seals configured to seal the valve body against an interior surface of the reservoir.

3. The system of claim 1, wherein the valve mechanism is connected to the valve body.

4. The system of claim 3, wherein the valve mechanism is connected to the valve body via one or more fasteners.

5. The system of claim 1, wherein the valve mechanism comprises a flap portion configured to cover the first valve passage when the valve mechanism is in the closed position and to deflect away from the first valve passage when the valve mechanism is in the opened position.

6. The system of claim 5, wherein the flap portion is more flexible than a remaining portion of the valve mechanism.

7. The system of claim 1, wherein the shock tube and the piston rod are configured to pass fluid through the first fluid line and the first valve passage in the same direction as through the second fluid line and the second valve passage such that fluid flows through the first and second valve passages in the same direction in the opened position.

8. The system of claim 1, wherein the shock tube is configured to flow fluid in the same direction through the first and second fluid lines toward the reservoir.

9. A shock absorber system comprising:
a reservoir comprising a reservoir interior; and
a reservoir valve comprising:
   a first valve passage;
   a second valve passage, the second valve passage fluidly separate from the first valve passage within the reservoir valve; and
   a valve mechanism configured to transition between an opened position and a closed position, the valve mechanism configured to be in the closed position and to inhibit flow between the first valve passage and the reservoir interior in the closed position, and the valve mechanism configured to permit flow between the second valve passage and the reservoir interior in the closed position,
wherein the valve mechanism is configured to be in the closed position with a pressure of fluid within the first valve passage below a threshold pressure, and wherein the valve mechanism is configured to be in the opened position with the pressure of fluid within the first valve passage at or above the threshold pressure to permit flow through the first valve passage,
wherein the valve mechanism comprises a flap portion configured to cover the first valve passage in the closed position and to deflect away from the first valve passage in the opened position, and
wherein the flap portion is more flexible than a remaining portion of the valve mechanism, the flap portion extending from the remaining portion to form a substantially planar surface along at least one side of the valve mechanism from the remaining portion to the flap portion.

10. The system of claim 9, wherein the valve mechanism is fixedly connected to a valve body of the reservoir valve, the valve mechanism comprising at least one layer of material extending from the fixed connection to and over the first valve passage.

11. The system of claim 10, wherein the valve mechanism comprises at least two layers of material at the fixed connection to the valve body.

12. A reservoir valve for use with a shock absorber, the reservoir valve comprising:
a valve body;
a first valve passage in the valve body, the first valve passage configured to pass fluid from a shock absorber through the first valve passage;
a second valve passage in the valve body, the second valve passage configured to pass fluid from the shock absorber through the second valve passage, the second valve passage fluidly separate in the valve body from the first valve passage; and
a valve member connected to the valve body and extending over the first valve passage, the valve member configured to transition between an opened position and a closed position, the valve member configured to inhibit flow in the first valve passage in the closed position and to permit flow through second valve passage in the closed position,
wherein the valve member is configured to be in the closed position with a pressure of fluid within the first valve passage below a threshold pressure, and wherein the valve member is configured to be in the opened position with the pressure of fluid within the first valve passage at or above the threshold pressure to permit flow through the first valve passage,
wherein the valve member comprises a flap, the flap extending adjacent from an opening of the second valve passage over an opening of the first valve passage, and
wherein a portion of the flap extending over the opening of the first valve passage is more flexible than a portion of flap adjacent the opening of the second valve passage.

13. The reservoir valve of claim 12, wherein the valve member is configured to be in the opened position with fluid flow in a first direction through both the first valve passage and the second valve passage and configured to be in the closed position with fluid flow in a second direction through the second valve passage such that fluid flow is inhibited through the first valve passage in the second direction.

14. The reservoir valve of claim 12, wherein the valve member has a substantially flat shape extending over at least a part of the valve body and the first valve passage without extending into the first valve passage.

15. The reservoir valve of claim 12, wherein the valve member comprises a flap portion configured to cover the first valve passage in the closed position and to deflect away from the first valve passage in the opened position.

16. The reservoir valve of claim 15, wherein the flap portion is more flexible than a remaining portion of the valve member, wherein the remaining portion is attached to the valve body, and wherein the remaining portion is configured to be in the same position relative to the valve body in the opened and closed positions.

17. The reservoir valve of claim 16, wherein the remaining portion comprises at least one additional layer of material relative to one or more layers of material forming the flap portion.

18. The reservoir valve of claim 12, wherein the portion of flap adjacent the opening of the second valve passage is thicker relative to the portion of the flap extending over the opening of the first valve passage.

* * * * *